Aug. 19, 1969     WOLF-DIETER BENSINGER     3,461,848
PISTON FOR A ROTARY PISTON INTERNAL COMBUSTION ENGINE
Filed Sept. 5, 1967

INVENTOR
WOLF-DIETER BENSINGER

BY *Craig & Antonelli*

ATTORNEYS

United States Patent Office 3,461,848
Patented Aug. 19, 1969

3,461,848
PISTON FOR A ROTARY PISTON INTERNAL COMBUSTION ENGINE
Wolf-Dieter Bensinger, Stuttgart-Riedenberg, Germany, assignor to Daimler-Benz Aktiengesellschaft, Stuttgart-Unterturkheim, Germany
Filed Sept. 5, 1967, Ser. No. 665,567
Claims priority, application Germany, Sept. 8, 1966, D 51,052
Int. Cl. F02b 53/00, 55/00
U.S. Cl. 123—8    8 Claims

ABSTRACT OF THE DISCLOSURE

A piston for a rotary piston internal combustion engine especially of trochoidal construction, which is provided at one end wall with a gear serving to control the rotary movement of the piston by its engagement with a fixed pinion, whereby the gear is arranged at a flange of the piston equalizing the thermal expansions in the piston.

Background of the invention

The present invention relates to a piston for a rotary piston internal combustion engine, especially for an internal combustion engine of trochoidal construction, having a hollow gear for the control of the piston rotation which is arranged at an end wall thereof and is either formed in one piece with the piston or welded to the piston.

The piston of a rotary piston internal combustion engine becomes during actual operation thereof considerably hotter at its outer circumference than inwardly thereof. As a result thereof, thermal expansions are produced with high tensional stresses which may lead to cracking of the hollow gear.

Summary of the invention

The present invention aims at preventing the crack formation in the hollow gear. The underlying problems are solved according to the present invention in that the hollow gear is arranged at a flange of the piston-equalizing thermal expansions in the piston.

The arrangement may be made thereby in such a manner that the flange is provided with at least one cut or indentation, for example, in the form of a groove, slot or the like, extending in the axial direction of the hollow gear wheel.

In an appropriate manner, the flange may be constructed S-shaped so that the tensional stresses can be equalized by the two annularly shaped grooves resulting from the S-shape.

Accordingly, it is an object of the present invention to provide a piston for rotary piston internal combustion engines, especially of trochoidal construction which avoids by simple means the aforementioned drawbacks encountered in the prior art constructions.

Another object of the present invention resides in a polygonal piston for rotary piston internal combustion engines, particularly of trochoidal construction, which avoids effectively the tensional stresses that may lead to damage of the hollow gear wheel arranged along one side of the piston.

A further object of the present invention resides in a piston for rotary piston internal combustion engines which equalizes stresses due to thermal expansions in the piston and keeps the tensional stresses from the hollow gear wheel serving for the control of the rotation of the piston.

Still another object of the present invention resides in a piston for rotary piston internal combustion engines which significantly increases the length of life of the piston, and in particular of the hollow gear.

Figure 1:
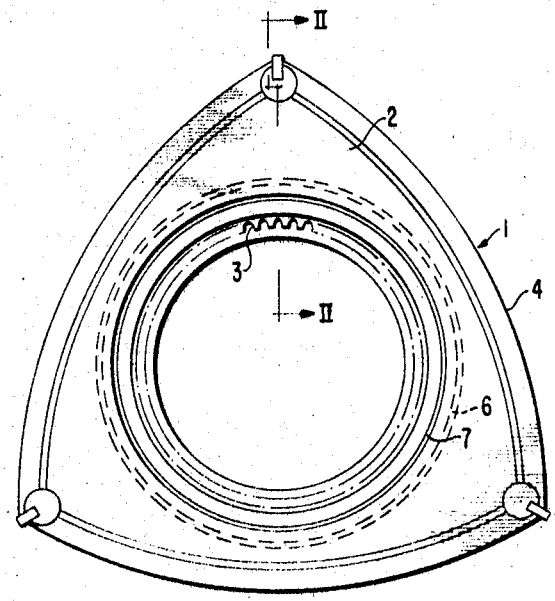
Figure 2:
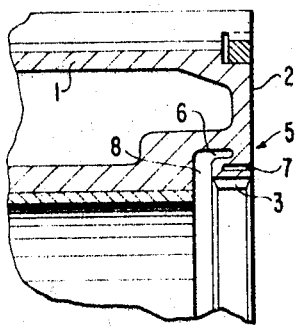

These and further objects, features and advantages of the present invention will become more obvious from the following description when taken in connection with the accompanying drawing which shows, for purposes of illustration only, one embodiment in accordance with the present invention, and wherein:

FIGURE 1 is a side elevational view on a piston in accordance with the present invention; and FIGURE 2 is a partial cross-sectional view, on an enlarged scale, taken along line II—II of FIGURE 1.

Referring now to the drawing wherein like reference numerals are used throughout the two views to designate like parts, the piston 1 for a rotary-piston internal combustion engine of trochoidal construction is provided at its end wall 2 with the hollow gear wheel 3. The hollow or ring gear 3, which serves in conjunction with a pinion fixed to the housing, to control the rotation of the piston 1 is made in one piece with the piston.

During the operation of the piston in the internal combustion engine, very high temperatures occur within the area of the piston flanks 4 whereas the temperatures in the radially inner regions of the piston, particularly the temperatures within the area of the hollow gear wheel 3, remain relatively low. The consequences thereof are thermal expansions within the material of the piston. High tensional stresses occur within the area of the hollow gear wheel 3 which might lead to a cracking and damaging thereof.

In order to equalize the thermal expansions in the piston 1 and to keep away the tensional stresses from the gear wheel 3, the gear wheel 3—as is particularly visible from FIGURE 2—is arranged at the flange 5 which, in turn, is provided with two annularly shaped cuts 6 and 7 extending in the axial direction. The radially outer cut 6 starts from an undercut 8 whereas the radially inner cut 7 starts from the end surface of the piston. Owing to the arrangement and provision of the cuts 6 and 7, an elastic connection is achieved between the hollow gear wheel 3 and the piston by way of the flange 5. A crack formation in the hollow gear wheel 3 no longer occurs so that the length of life of the hollow gear wheel is considerably increased.

While I have shown and described only one embodiment in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A piston for a rotary piston internal combustion engine, especially of trochoidal construction, having a gear arranged at an end wall thereof, wherein the improvement comprises flange means in the piston provided with recess means for equalizing the thermal expansion within the piston, said gear being arranged at said flange means.

2. A piston according to claim 1, wherein the gear is welded to said end wall.

3. A piston according to claim 1, wherein said gear is formed in one piece with said end wall.

4. A piston according to claim 1, wherein said recess means is formed by at least one cut of approximately annular shape and extending generally in the axial direction of the gear.

5. A piston according to claim 4, wherein said flange means is of approximately S-shaped construction.

6. A piston according to claim 1, wherein said flange means is of approximately S-shaped construction.

7. A piston according to claim 6, wherein said approximately S-shaped flange means is formed in effect by two recesses extending in opposite directions.

8. A piston according to claim 7, wherein said recesses are substantially annular, one recess being disposed radially outwardly and starting from an undercut on the inside of the piston and the other recess being disposed radially inwardly and starting from an end face of the piston.

References Cited

UNITED STATES PATENTS

| | | |
|---|---|---|
| 3,134,537 | 5/1964 | Bentele et al. |
| 3,196,850 | 7/1965 | Jones. |
| 3,234,922 | 2/1966 | Froede. |
| 3,297,240 | 1/1967 | Tatsutomi _____ 74—411 X |

LEONARD H. GERIN, Primary Examiner

U.S. Cl. X.R.

74—411; 230—145